United States Patent [19]

Baum

[11] 4,190,237
[45] Feb. 26, 1980

[54] APPARATUS FOR TREATING REFINERY WASTE GASES

[75] Inventor: Jörg P. Baum, Essen, Fed. Rep. of Germany

[73] Assignee: Verfahrenstechnik Dr. Ing. Kurt Baum, Essen, Fed. Rep. of Germany

[21] Appl. No.: 891,896

[22] Filed: Mar. 30, 1978

[30] Foreign Application Priority Data

Apr. 2, 1977 [DE] Fed. Rep. of Germany ....... 2714825

[51] Int. Cl.² .............................................. C21C 5/40
[52] U.S. Cl. .................................... 266/80; 266/147; 266/157; 266/158
[58] Field of Search ............... 266/142, 143, 147, 157, 266/158, 159, 80

[56] References Cited

U.S. PATENT DOCUMENTS

| 3,333,839 | 8/1967 | Maehara et al. | 266/158 |
| 3,472,500 | 10/1969 | Rinesch et al. | 266/158 |
| 3,617,043 | 11/1971 | Hirao | 266/158 |
| 3,743,264 | 7/1973 | Baum et al. | 266/158 |
| 3,972,708 | 8/1976 | Baum | 266/147 |
| 4,054,274 | 10/1977 | Hogner | 266/158 |

Primary Examiner—John McQuade
Attorney, Agent, or Firm—Toren, McGeady and Stanger

[57] ABSTRACT

A method for treating waste gases which are emitted from metallurgic refining methods wherein the gas is collected, cooled, cleaned and stored, and wherein the gas is removed from the refining method and treated under an excess pressure which pressure results from the refinery gas pressure. An apparatus for carrying out the method comprising a metallurgic vessel contained in a pressure vessel which is connected to a waste gas cooler and a dust separator is disclosed.

11 Claims, 5 Drawing Figures

APPARATUS FOR TREATING REFINERY WASTE GASES

BACKGROUND OF THE INVENTION

1. Field of the Invention

The invention relates to an apparatus for treating the waste gases of metallurgic refining vessels wherein the waste gas is collected, cooled, cleaned and stored.

2. Description of the Prior Art

In the known refining methods, particularly the converter method, the waste gases leaving the refining vessel have a high temperature of 1450° to 1600° C. and contain significant amounts of dust, the concentration of which may reach an order of magnitude of 100 to 200 g/Nm³. From these two conditions, which can vary during the refining, significant problems develop in view of the large amounts of gases of approximately 2 Nm³/min per ton of casehardening materials which are produced, although the amount of gases vary with time. These problems result primarily because a major portion of the waste gas is carbon monoxide which cannot be discharged into the atmosphere or flared for reasons of environmental protection.

The main features of the known refining methods with oxygen are the use of a converter for receiving the liquid crude iron and the solid admixtures, i.e., flux, scrap metals, etc., the converter being able to rotate about a horizontal axis, an arrangement for collecting and preparing the escaping reaction gases, as well as the batch-wise operation consisting of a sequence of individual method steps.

It is of special importance that the converter and the system for treating the waste gas are arranged at a certain spatial distance from each other. This results in the waste gas influencing the atmosphere by emission and/or the waste gas itself being influenced because of a reaction with the surrounding air. However, each of these effects are either completely undesirable or desirable only to a limited degree and, in some cases, must be completely avoided.

No matter what happens to the waste gas, a cleaning of the gas is always required in order to achieve dust contents in the order of magnitude of a tenth of a gram per normal or standard cubic meter. The costs of the cleaning of the waste gas are mainly determined by the temperature of the gas and by the volume of the gas. Therefore, the efforts in practice are directed to keeping the temperature of the waste gas as well as the volume of the waste gas as low as possible. Since the amount of waste gas and the temperature of the waste gas are mainly determined by the carbon content and the temperature of the melt, the prerequisite for an economical cleaning of the gas is to minimize the so-called "after-burning", i.e., the reaction of the carbon monoxide created during refining with the surrounding air. This aspect is of decisive importance since the after-burning leads to significant increases in the temperature and correspondingly, to proportionate increases, for example, a three-fold increase, of the volume of the waste gases.

The problem of sealing the system as extensively as possible became important because of the increasing size of converter units and the resulting increased amounts of waste gases. In open systems, these waste gases burn together with atmospheric air. As a result, the volume of the waste gases is multiplied and the temperatures are increased by several hundred degrees Celsius.

A known arrangement for closing the gap between the converter and the apparatus or arrangement for treating the gas, consists of a sleeve-like locking or sealing ring which can be raised or lowered. This ring makes it possible to have a certain control over the influence of the surrounding air. However, it is not possible to prevent the effects of the gas when an excess pressure buildup occurs during the process. The reason for this is that when there is excess pressure, any kind of leakage may lead to the emission of dangerous substances. In addition, a cumbersome drive and complicated, but ineffective, sealings are required for the locking or sealing ring. Furthermore, in order to raise the sealing ring into the open-position requires a building of sufficient height to provide a sufficient, free space, above the converter.

Methods are also known wherein the annular gap between the ring and converter aperture remaining after lowering the locking ring is sealed off by a veil or curtain of inert gas or water vapor applied under pressure. However, such a gas curtain can only be effective if the difference between the atmospheric pressure and the pressure of the waste gas is as small as possible. The amounts of waste gases vary considerably during refining and sometimes even tend to vary in a pulse-like manner. Therefore, a minimal difference in pressure or an insignificant excess pressure of the waste gas in the region of the gap can only be achieved with the aid of a quick response pressure control which balances the variations of the volume flow.

A pressure control having the required speed of response is extremely cumbersome and is not capable of completely suppressing the after-burning. For example, in the conventional apparatuses, there is usually about ten percent of after-burning. Accordingly, larger amounts of waste gases must be handled and an increased cooling capacity is required resulting in increased costs for the apparatus and for operation.

Another disadvantage of the use of more or less open systems lies in the fact that, due to the small amounts of carbon monoxide formed at the beginning and during the final stage of refining, an explosive mixture of carbon monoxide and oxygen may be easily formed if refining is interrupted or during operation at reduced pressure or when the openings are not carefully closed or locked. As a result, the converter and the components which convey the waste gas must be carefully washed out or rinsed. Finally, in the conventional apparatuses, there is also the great danger that the hood or dome or the locking ring will stick to the converter aperture due to metal and slag sprinkles or sprays.

Moreover, after-burning leads to a significant loss of energy since after-burning yields carbon dioxide which cannot be utilized and is only carried along as ballast gas and reduces the heating value of the waste gas. The heating value is essentially determined by the carbon monoxide content of the waste gas. Additional energy is required because of the weight of the charges and consequently, the amounts of waste gas produced per unit time have significantly increased. This, in turn, requires blowers with delivery volumes of several 100,000 m³/h and delivery pressures of more than 200 mbar for transporting the waste gas through the treatment plant. Electro-motors with outputs of several MW are used for driving these blowers. These large units lead, among other things, to increased noise emissions which must be counteracted by additional measures.

SUMMARY OF THE INVENTION

The present invention provides a method which eliminates the danger of after-burning and which also is characterized by low plant and operation costs. This objective is achieved by keeping the waste gas in a closed system until it is used, i.e., between the location of production and the gas reservoir. More particularly, in the process of the present invention, the waste gas is carried off and treated at an excess pressure which results from the pressure of the refinery gas. Accordingly, the waste gas is driven through the waste gas system into a conventional gas reservoir under full utilization of the pressure of the refinery gas and of the pressure resulting from the formation of the waste gas. Thus, in the simplest case, the process can be controlled by means of a pressure measurement. A change in the measured pressure indicates, for example, the change from a refining or decarbonization stage to another stage or it indicates a leak.

The inventive method can be performed in an apparatus consisting of a pressure vessel containing a metallurgical vessel, with a gas-tight connection between a waste gas cooler and a waste gas cleaner and the pressure vessel. This pressure vessel may be water-cooled or be provided with a fireproof lining. The pressure vessel and the corresponding components of the apparatus form a closed system into which, during the refining, only the refinery gas and the flux, and possibly the alloying and deoxidation agents, are introduced with there being no possibility that gas will escape or that air will penetrate or infiltrate the system. Thus, not only is the after-burning eliminated, but also, the danger that the melt will absorb harmful nitrogen from the air is avoided.

Under normal circumstances, the waste gas pressure is sufficient for cleaning the waste gas, for example, in a Venturi-washer operating at a high differential pressure and for filling a gas reservoir.

DESCRIPTION OF THE PREFERRED EMBODIMENT

In order to be able to charge the refining vessel and to be able to, if necessary, repair and exchange the refining vessel, the pressure vessel preferably consists of an approximately cylindrical casing, a removable dome and a removable bottom. The individual parts of the pressure vessel are connected to each other preferably through sealings which are located at the outside and which are, thus, protected from heat, metal and slag. The removable bottom allows the tilted converter to discharge into a ladle located underneath and allows the converter to be lined or blocked up from below. The bottom may be constructed as a slag ladle.

For charging and adding flux, the pressure vessel may be provided with a feed opening which can be closed or locked, for example, a door and, additionally, with a sluice. Furthermore, a sight glass may be arranged in the wall of the vessel and/or a television camera may be arranged in the interior of the vessel.

After-burning can be completely eliminated when the pressure vessel, in accordance with the present invention, is provided with a connection for rinsing gas which will allow the atmospheric oxygen to be rinsed out after charging or before refining begins. In addition, the pressure vessel can be provided with a sampler and/or a temperature measuring device in order to facilitate a continuous control of the composition of the slag and/or the melt.

The rinsing out of the atmospheric oxygen as well as the comparatively low yield of carbon monoxide in the initial and the final stage of refining are taken into consideration according to the invention by the fact that the Venturi-washer is connected to a chimney or stack and a gas reservoir through a three-way valve. Thus, the rinsing gas and the initial and the final gas having a relatively low heating value can be discharged into the atmosphere and can be flared if necessary and the reservoir can be kept free from this gas. The three-way valve is preferably controlled by a device for analyzing the gas which continuously measures the content of carbon monoxide, carbon dioxide and oxygen in the cooled and cleaned waste gas and which can be included into the control of the process.

Figure 1:
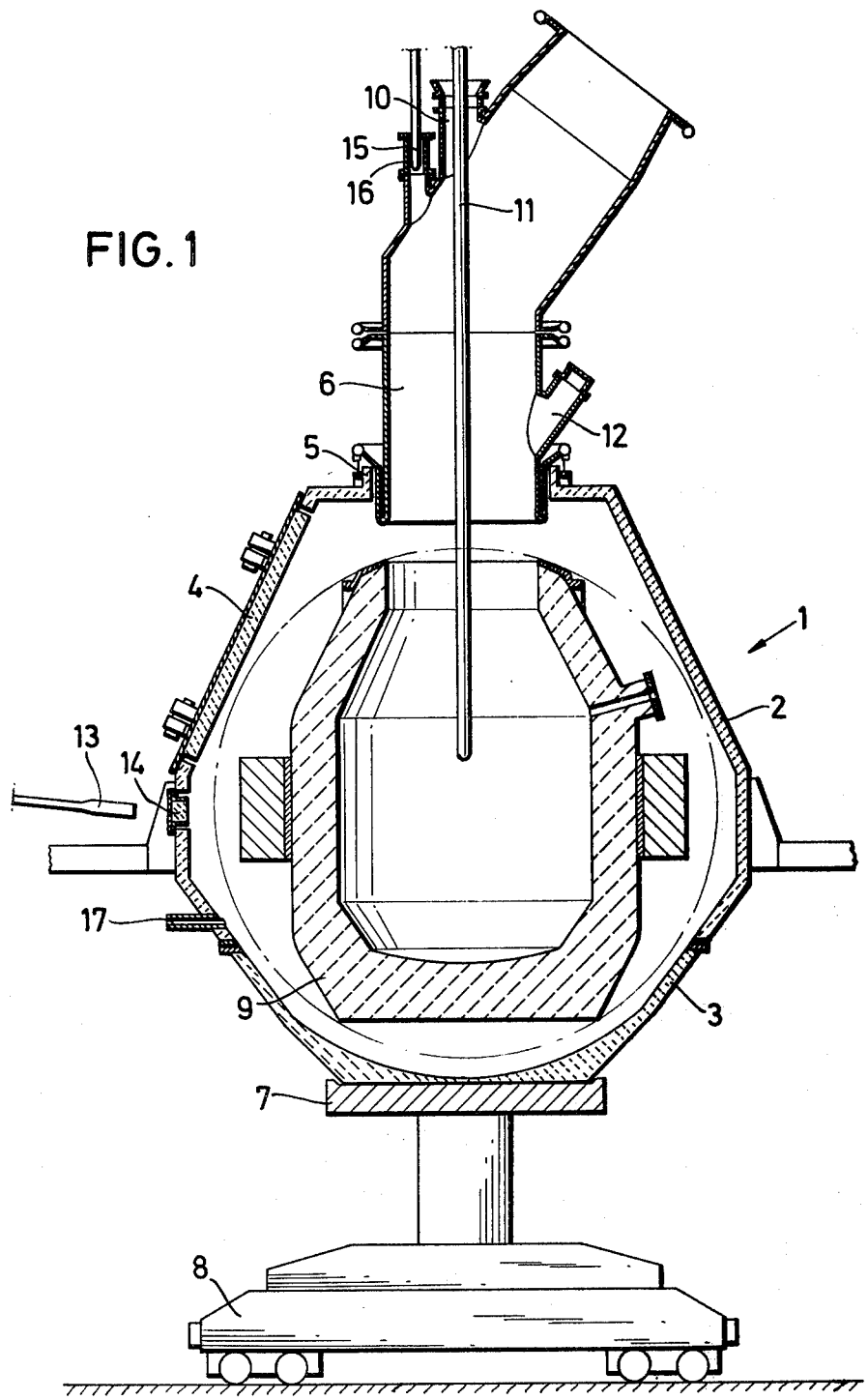
FIG. 1 shows a schematic representation of a vessel for refining crude iron to steel under pressure.

Referring now to FIG. 1, pressure vessel 1 consists of a casing 2, a movable bottom 3, a door 4 and a neck 5 adapted for gas-tight connection with a waste gas stack 6. The bottom 3 is arranged on table 7 of a lifting truck 8 which allows lateral movements of the vessel bottom 3. In the interior of the pressure vessel 1, there is located a conventional converter 9. An oxygen lance 11 guided through a gas-tight bushing 10 in the waste gas stack 6 projects into the converter 9. On the other hand, the pressure vessel 1 may also contain a converter for the oxygen blowing method, e.g., a converter having a tuyere bottom. Most important factor is that the converter is located in a closed pressure vessel which holds the refinery waste gas and discharges the waste gas without allowing atmospheric oxygen to enter. As a result, the one danger is that of an after-burning of the carbon monoxide created during refining when the refining takes place at excess oxygen. However, since efforts are made to keep the oxygen excess as low as possible, there is also minimum burning of carbon monoxide in the converter or in the pressure vessel.

The converter is pivotally supported by itself or together with the pressure vessel and, therefore, allows conventional charging and discharging. Lime and ore can be added through a sluice 12 arranged in the waste gas stack 6 without the danger of any significant gas emission from the pressure vessel 1. A sample can be easily taken after refining by means of a sampler 13 which, additionally, is provided with a thermocouple. The lance of the sample 13 is passed or guided through an opening in the casing 2. This opening can be closed by means of a pressure-tight cover 14. This opening can also be utilized in measuring the temperature within the pressure vessel. The sample can also be taken when the converter is in a vertical position. In this case the sampling lance 15 is used. The lance 15 is guided through an opening which is sealed off by means of a gas-tight bushing 16. Furthermore, the interior of the pressure vessel and the parts of the apparatus which are connected to the waste gas stack 6 can be rinsed by means of an inert gas through a gas connection 17.

The door 4 and the opening of the gas stack 6 are sufficiently distant from the converter aperture to prevent the creation of deposits or encrustation due to throw-out. Furthermore, deposits would not prevent the converter from tilting because of the sufficiency of the space.

Figure 2:
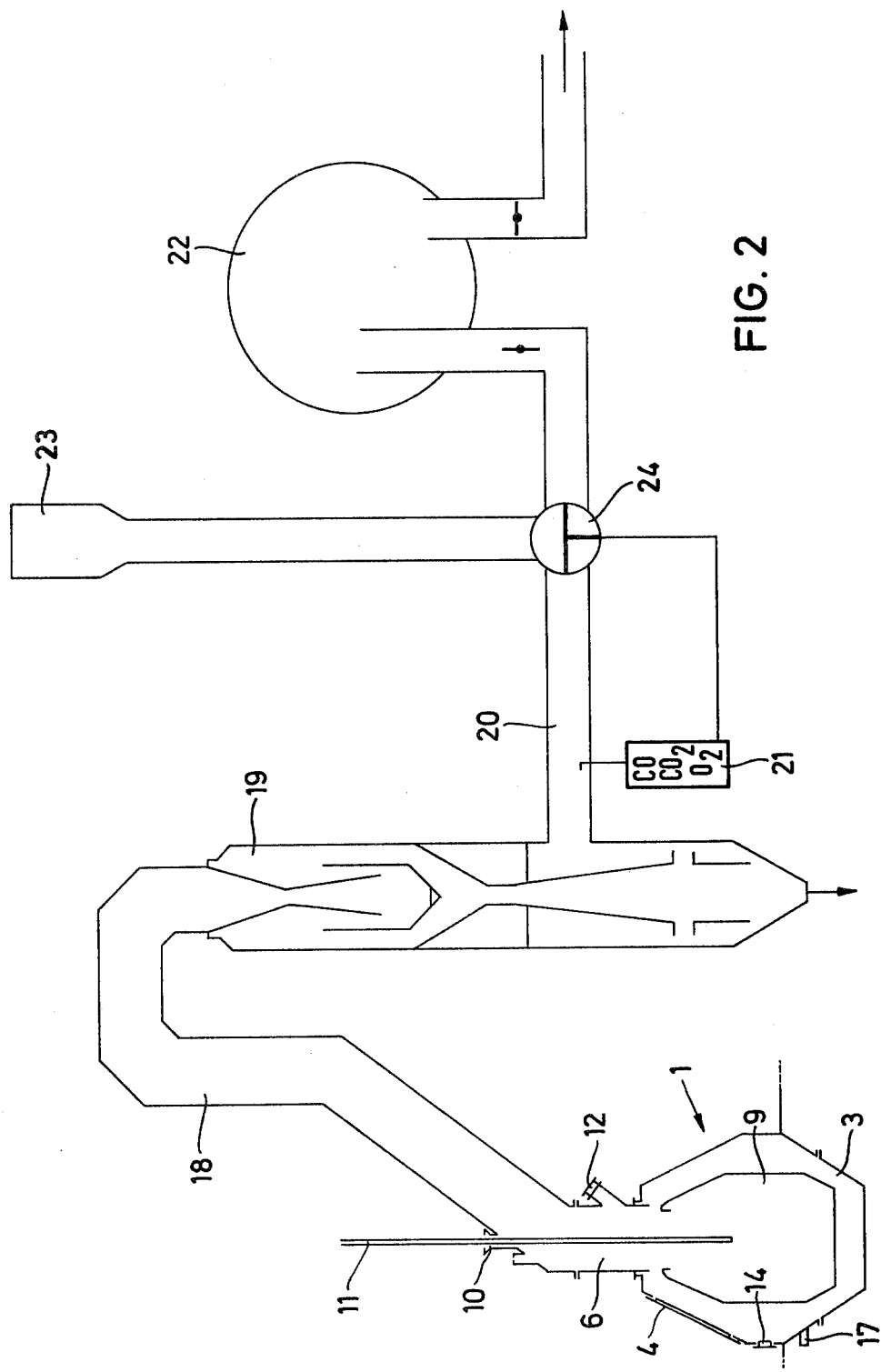
FIG. 2 shows the pressure vessel shown in FIG. 1 connected to an arrangement for the cleaning of waste gas and to a reservoir for useful gas.

FIG. 2 is a diagram showing the method for the further treatment of the waste gas. As shown, waste gas stack 6 is followed by a conventional gas cooler 18 and the gas cooler 18 is, in turn, followed by a Venturi-washer 19. A gas pipe 20 leads from the Venturi-washer 19 through an analysis device 21 to a gas reservoir 22 on the one hand and to a chimney 23 on the other hand. The device for analysis controls a three-way valve 24 which, depending on the carbon monoxide content, delivers the waste gas to the reservoir 22 or the chimney 23.

Figure 3:
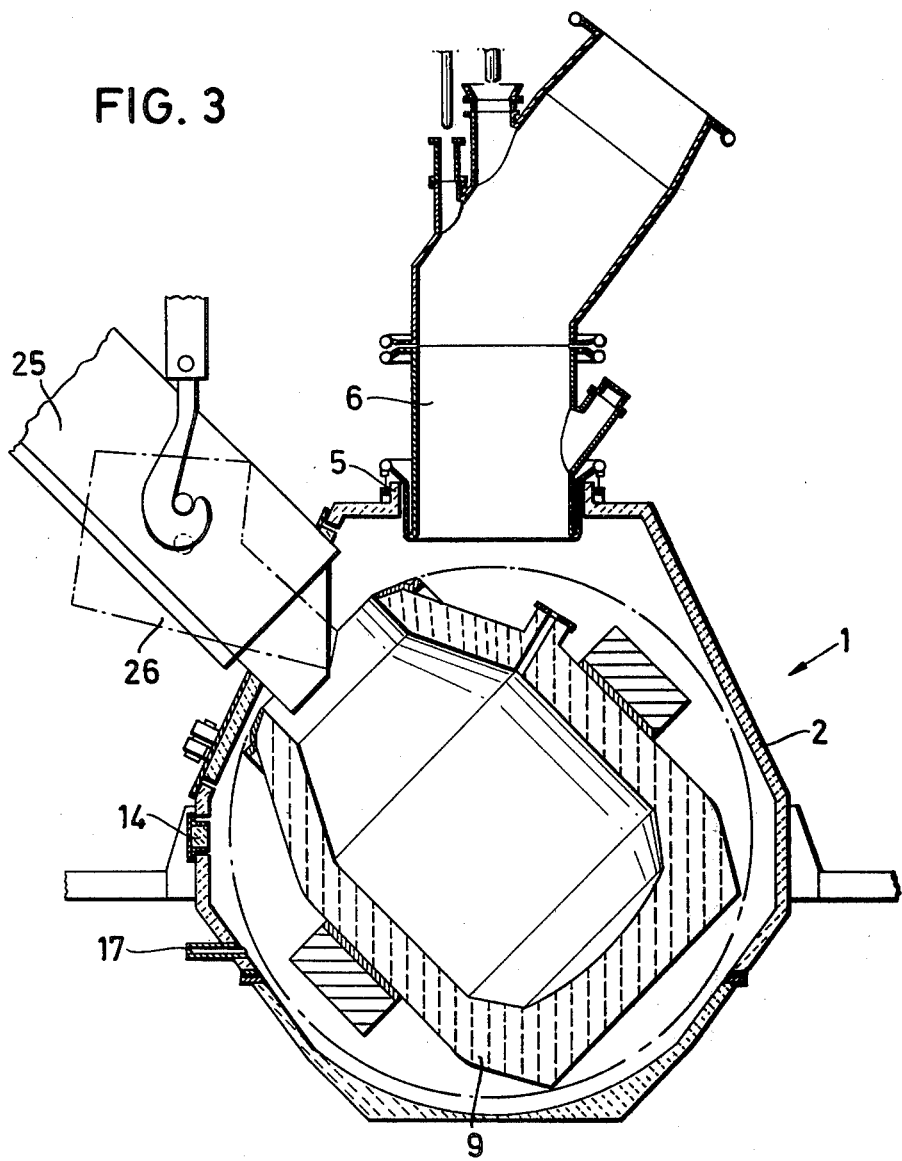
FIG. 3 shows the pressure vessel during charging.
Figure 4:
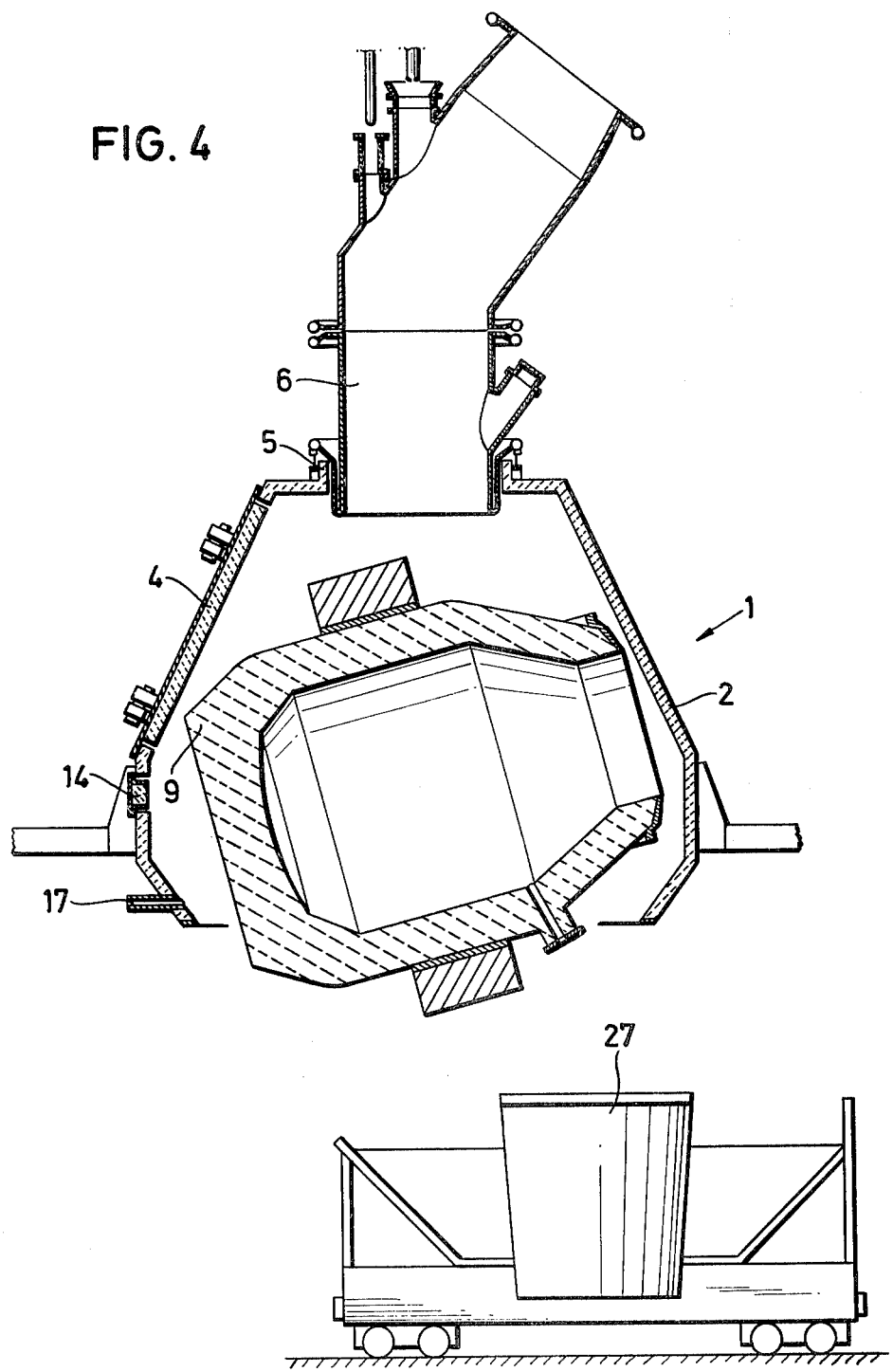
FIG. 4 shows the pressure vessel during steel tapping and FIG. 5 shows the pressure vessel during discharge of the slag.
Figure 5:
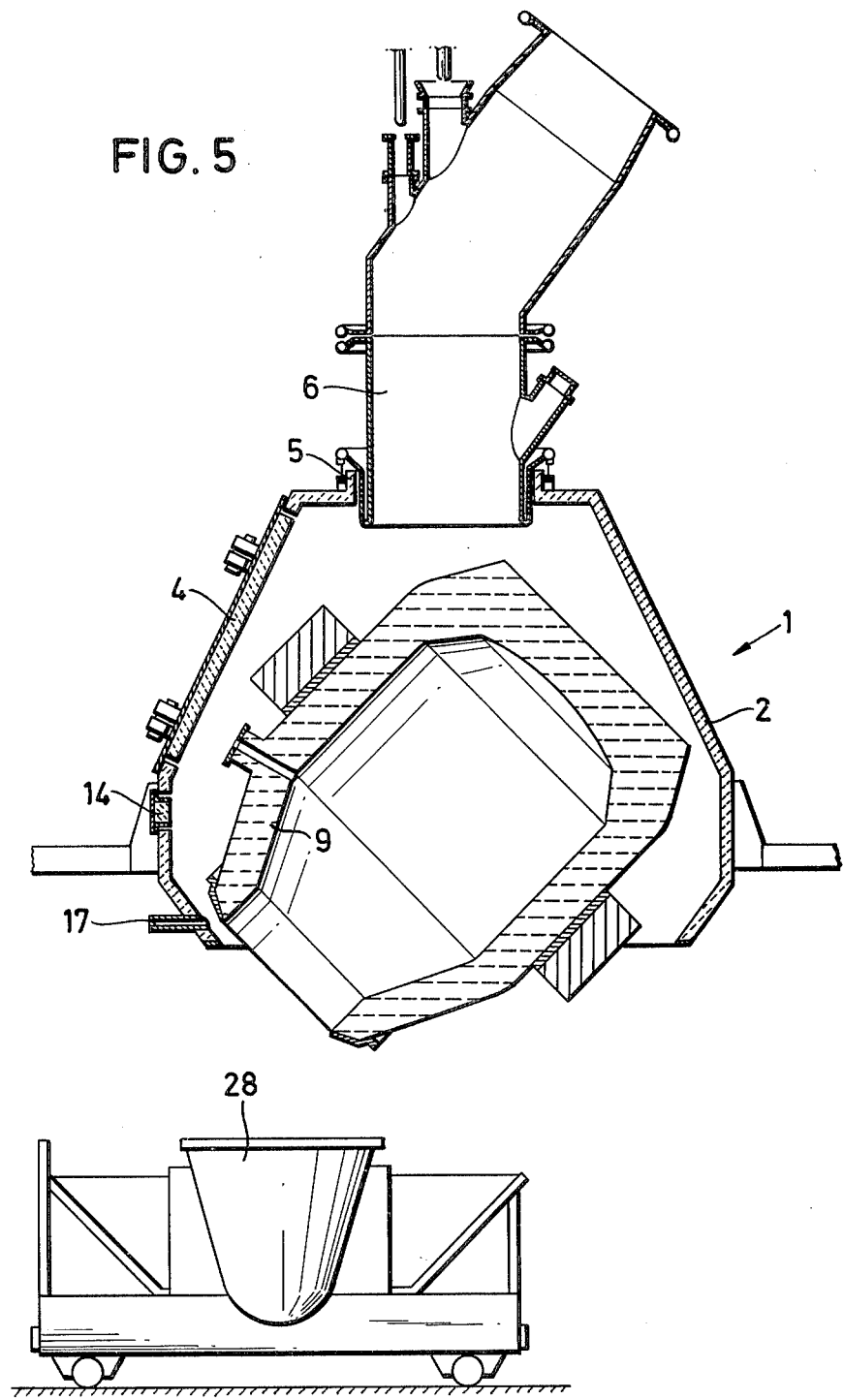

The apparatus shown in FIGS. 3 to 5 is operated in the following manner. First, with door 4 open, the converter is charged (FIG. 3) with scrap metal from a scrap metal trough 25 and with crude iron from a crude iron ladle 26. After charging is completed, the door 4 is closed gas-tight. As soon as the pressure vessel is tightly closed and the converter is in the position for refining, the atmospheric oxygen in the apparatus is rinsed out by means of inert gas supplied through gas connection 17. In this stage of operation the three-way valve 24 is in the "chimney" position since not only the air, but also, the rinsing gas contain practically no carbon monoxide.

After rinsing, oxygen lance 11 is extended into the converter 9 and, simultaneously, the oxygen entrance is opened. During the initial stage of refining, an oxidation of the silicon and the manganese primarily takes place so that only very little carbon monoxide is created and, accordingly, a waste gas having a low heating value is created. It is only with increased burning of the carbon that the amount of the waste gas is increased and the carbon monoxide content of the waste gas is increased. As soon as a carbon monoxide level reaches that for which the analysis device 21 is set, the three-way valve 24 switches to the gas reservoir 22. The three-way valve 24 is reset by the analysis device 21 in a similar manner into the "chimney" operating position towards the end of refining, i.e., when the carbon content of the melt is mostly decomposed and when only a small amount of carbon monoxide is produced. This is the case, for example, when the carbon monoxide content falls below 20% by volume.

Finally, oxygen lance 11 is raised, the oxygen supply is interrupted and converter 9 is tilted so that a steel sample can be taken by means of sampler 13 and, simultaneously, the temperature is measured. For this purpose, the pressure vessel 1 is first rinsed with inert gas and then door 14 is opened or lance 15 is retracted.

When the steel has passed the desired final analysis, pressure vessel bottom 3 is lowered by means of lifting truck 8 and is moved laterally. The converter is first rotated or tilted into the "steel-tapping" position and the liquid steel is discharged into a ladle 27 (FIG. 4) located underneath the pressure vessel 1. Subsequently, the slag is poured into a slag crucible 28 (FIG. 5).

A comparison of an apparatus of the kind shown in the drawing with a conventional hood having a locking ring and venting control, the remaining constructional features being equal, resulted in the following data:

| | |
|---|---|
| Weight of tapping | 200 t. |
| Crude iron input | 175 t. |
| Carbon content in the crude iron | 4.3% |
| Oxygen consumption | 700 Nm$^3$/min |
| Blowing time | 17 min |
| Gas yield | 60 mn$^3$/t crude iron |

| | Conventional Method | Refining Under Pressure |
|---|---|---|
| Air consumption, factor (%) | 10 | 0 |
| Amount of waste gas (mn$^3$/h) | 94,000 | 80,000 |
| Temperature of waste gas (°C.) | 1920 | 1600 |
| Amount of heat to be discharged up to 1000° C. (Mio kcal/h) | 35.5 | 18.7 |
| Blower motor input (KW) | 1600-1800 | 0 |
| Portion of CO in total waste gas (%) | 70 | 90 |
| Recoverable amount of heat (Mio kcal/Ch) | 22 | 28 |
| Dust content in the clean gas (mg/mn$^3$) | 50-150 | 5-10 |

The above data shows that the method of the present invention possesses a number of advantages whose effects have a mutually favorable influence. Considering first the fact that the largest portion of the investment costs for the plant for the treatment of waste gas is required for the gas cooler 18, significantly reduced sctructural dimensions in two respects result. The complete suppression of burning results in a lower input temperature and in a smaller volume of the waste gas. This volume is once again reduced because the gas is under a relatively high pressure and from the increased gas velocity and the increased pressure results in a better heat transfer.

The former results in a significantly reduced cross section of the pipe or line and the latter results in a shortening of the pipe or line component. Due to the fact that only the sensible heat is yielded, the problem of a heat recovery, for example, in the form of vapor, becomes of lesser importance. However, there are also conventionally operated apparatuses which do not utilize the waste heat but which destroy or annihilate the waste heat. According to the method of the present invention, a significantly reduced expenditure for this recooling is required. From this, a very high quality of the waste gas and, in turn, an effective use for its heating value results.

However, the most prominent advantage of the present invention lies in the fact that a blower with a very high energy demand for the drive unit is no longer required. As a side effect, the maintenance problems when wear occurs and when deposits are formed, are avoided.

Additionally, the dust content in the cleaned waste gas is only a fraction of that of the waste gas treated in the conventional manner. The higher degree of purity of the waste gas can be explained by the fact that a higher differential pressure for the washing device is available and that, in a discharge without burning the waste gas, dust is obtained which can be separated much more easily than the dust gas which has been subjected to partial after-burning.

Another advantage of the present method lies in the fact that the formation pressure of the waste gas is sufficient, not only for the gas cleaning, but also, for the gas storage. The pressure existing at the reservoir inlet is sufficient to fill a spherical vessel or a cylinder. From this, another advantage results in that this type of high pressure gas tank is much more economical than a low pressure gas tank having an equally useful volume. The high pressure of the gas in the gas tank renders the use of blowers for pressure increase superfluous and leads to additional energy savings.

We claim:

1. An apparatus for treating waste gases emitted from metallurgic refining wherein metals are treated in a vessel comprising a closed pressure vessel having a removable bottom, a metallurgical treatment vessel within said pressure vessel, said pressure vessel being connected to a waste gas cooler and a dust separator.

2. The apparatus of claim 1 wherein the pressure vessel communicates with a waste gas cooler and a dust separator sequentially, said dust separator being a venturi-washer.

3. The apparatus of claim 1 wherein said pressure vessel comprises a jacket surrounding said metallurgical vessel, a door for access to the metallurgical vessel and a bottom separable from the jacket.

4. The apparatus of claim 3 wherein the pressure vessel is arranged on a lifting truck.

5. The apparatus of claim 1 wherein the pressure vessel has a gas-tight inlet opening for addition of materials to the metallurgical vessel.

6. The apparatus of claim 1 wherein the pressure vessel has means for rinsing the gas therein.

7. The apparatus of claim 1 wherein the pressure vessel has means for allowing the taking of samples of the metal in the metallurgical vessel.

8. The apparatus of claim 1 wherein the metallurgical vessel is pivotably mounted within the pressure vessel.

9. The apparatus of claim 1 wherein the pressure vessel has means for allowing measurement of the temperature therein.

10. The apparatus of claim 2 wherein the venturi-washer is connected in a gas-tight manner through a three-way valve to a gas reservoir and to a chimney the valve being adapted to control the relative amount of gases introduced to the chimney and the reservoir from the washer.

11. The apparatus of claim 10 wherein means for analysis of the waste gas is located between venturi-washer and the three-way valve and the gas analysis means has means for controlling the position of the valve.

* * * * *